(12) United States Patent
Zhang et al.

(10) Patent No.: US 12,673,593 B2
(45) Date of Patent: Jul. 7, 2026

(54) HEADREST STRUCTURE

(71) Applicant: Yanfeng International Automotive Technology Co., Ltd., Shanghai (CN)

(72) Inventors: Xinze Zhang, Shanghai (CN); Yineng Shen, Shanghai (CN); Xiaocui Zhang, Shanghai (CN); Kunjia Gan, Shanghai (CN)

(73) Assignee: Yanfeng International Automotive Technology Co., Ltd., Shanghai (CN)

( * ) Notice: Subject to any disclaimer, the term of this patent is extended or adjusted under 35 U.S.C. 154(b) by 149 days.

(21) Appl. No.: 18/721,262

(22) PCT Filed: Aug. 24, 2022

(86) PCT No.: PCT/CN2022/114367
§ 371 (c)(1),
(2) Date: Jun. 18, 2024

(87) PCT Pub. No.: WO2023/130738
PCT Pub. Date: Jul. 13, 2023

(65) Prior Publication Data
US 2024/0351494 A1 Oct. 24, 2024

(30) Foreign Application Priority Data
Jan. 10, 2022 (CN) .......................... 202210022466.6

(51) Int. Cl.
*B60N 2/80* (2018.01)
*B60N 2/829* (2018.01)
(Continued)

(52) U.S. Cl.
CPC ................ *B60N 2/829* (2018.02); *A47C 7/38* (2013.01); *B60N 2/809* (2018.02); *B60N 2/853* (2018.02)

(58) Field of Classification Search
CPC ........ B60N 2/829; B60N 2/809; B60N 2/853; B60N 2/865; A47C 7/38
See application file for complete search history.

(56) References Cited

U.S. PATENT DOCUMENTS 9,566,884 B2* 2/2017 Line ...................... B60N 2/821
10,676,002 B2 6/2020 Milner et al.
(Continued)

FOREIGN PATENT DOCUMENTS

CN 201347014 Y 11/2009
CN 101734183 A 6/2010
(Continued)

OTHER PUBLICATIONS

International Search Report and Written Opinion for PCT Application No. PCT/CN2022/114367 dated Sep. 28, 2022, 13 pages.
(Continued)

*Primary Examiner* — Syed A Islam
(74) *Attorney, Agent, or Firm* — Cooley LLP

(57) ABSTRACT

A headrest structure, comprising a headrest driving seat (400) fixed to a seat backrest, a lead screw motor (410), a gear mechanism (330), transmission racks (320) and a headrest part (10). The headrest structure further comprises a headrest rear cover plate (200) disposed on a rear side of the headrest part (10), wherein the headrest rear cover plate (200) is provided thereon with rear cover racks (220). The gear mechanism (330) is engaged between the rear cover racks (220) and the transmission racks (320). The lead screw motor (410) drives the gear mechanism (330) to move according to the principle of a lead screw transmission mechanism, thereby driving the headrest part (10) to move relative to the headrest driving seat (400).

9 Claims, 12 Drawing Sheets

(51) Int. Cl.

| | |
|---|---|
| *A47C 7/38* | (2006.01) |
| *B60N 2/809* | (2018.01) |
| *B60N 2/853* | (2018.01) |

(56) References Cited

U.S. PATENT DOCUMENTS

| | | | | |
|---|---|---|---|---|
| 11,338,714 | B2 * | 5/2022 | Milner | .................. B60N 2/853 |
| 2008/0315653 | A1 | 12/2008 | Brunner et al. | |
| 2010/0127541 | A1 | 5/2010 | Kotz | |
| 2013/0002000 | A1 | 1/2013 | Delling et al. | |
| 2013/0229043 | A1 | 9/2013 | Radhakrishnan | |

FOREIGN PATENT DOCUMENTS

| | | | |
|---|---|---|---|
| CN | 102398539 | A | 4/2012 |
| CN | 102795133 | A | 11/2012 |
| CN | 112428900 | A | 3/2021 |
| CN | 112815544 | A | 5/2021 |
| CN | 114379439 | A | 4/2022 |
| EP | 4375138 | A1 | 5/2024 |
| FR | 2899530 | A1 | 10/2007 |
| JP | 2017178096 | A | 10/2017 |
| KR | 20010010060 | A | 2/2001 |

OTHER PUBLICATIONS

Office Action and Search Report for Chinese Application No. CN202210022466.6 dated Jul. 14, 2023, 11 pages.

Office Action and Search Report for Chinese Application No. CN202210022466.6 dated Mar. 25, 2023, 13 pages.

Office Action and Search Report for Chinese Application No. CN202210022466.6 dated Sep. 13, 2022, 12 pages.

Office Action for Chinese Application No. CN202210022466.6 dated Nov. 16, 2023, 8 pages with English machine translation.

EP Application No. 22918193.8, Extended European Search Report mailed Dec. 12, 2025, Applicant Yanfeng International Automotive Technology Co., Ltd., 18 pages.

\* cited by examiner

410

413

412

414

400

410

410

400

414

400

HEADREST STRUCTURE

RELATED APPLICATIONS

This application is a national stage of International Application No. PCT/CN2022/114367, filed Aug. 24, 2022, which claims priority to Chinese Patent Application No. 202210022466.6, filed Jan. 10, 2022. Both of the aforementioned applications are hereby incorporated by reference in their entireties.

TECHNICAL FIELD

The present invention relates to the field of automotive seats, in particular to a headrest structure.

BACKGROUND ART

With the development of the automotive industry and changes in the automotive market, in order to improve users' experience, more and higher demands concerning comfortability are put forward for the automotive seats to enable the seats can exhibit an exquisite shape and appearance while ensuring the headrest to be adjustable over a large stroke.

For this purpose, a Chinese utility model patent with an application number of 202121661847.6 discloses a zero-gravity seat headrest, comprising a fixed base mounted on the seat through a headrest support rod, a headrest and a headrest motor, and characterized in that the headrest motor drives the headrest to move relative to the fixed base through a composite movement mechanism consisting of a lead screw-nut mechanism and a gear-rack mechanism. In this patent, a slider mechanism is adopted as a transmission medium to drive the front cover of the headrest to move by the motor arranged on the back cover of the headrest. This composite movement mechanism is complex in structure, and the three mechanisms (the lead screw-nut mechanism, the gear-rack mechanism and the slider mechanism) included therein are not rigidly connected with each other and the three mechanisms occupy a lot of headrest layout space, which leads to a thin comfort layer of the headrest and affects the riding experience.

CONTENT OF THE INVENTION

An object of the present invention is to provide an integrated headrest structure with a simple structure and a high riding comfortability, aiming at solving the problem that the prior art zero-gravity seat headrest has a complex structure and the riding experience thereof is affected.

In order to achieve the above object, the technical solution adopted by the present invention is as follows:

A headrest structure comprises a headrest driving seat fixed to a seat backrest, a lead screw motor, a gear mechanism, transmission racks and a headrest part;

the headrest structure further comprises a headrest rear cover plate disposed on a rear side of the headrest part, the headrest rear cover plate being provided thereon with rear cover racks;

the gear mechanism is engaged between the rear cover racks and the transmission racks;

the lead screw motor drives the gear mechanism to move according to a principle of a lead screw transmission mechanism, thereby driving the headrest part to move relative to the headrest driving seat.

In a preferred embodiment of the present invention, the gear mechanism consists of a nut mechanism, a shaft sleeve, a gear shaft and gears;

the gear shaft extends through the shaft sleeve, and the gears are provided at two ends of the gear shaft respectively;

the lead screw motor is fixed to the headrest driving seat, and the lead screw motor drives the gear mechanism to move via the nut mechanism, thereby enabling the gears engaged between the rear cover racks and the transmission racks to rotate to drive the headrest rear cover plate to move.

In a preferred embodiment of the present invention, the lead screw motor is fixed above the driving seat by a bolt extending through the driving seat and a flat washer from below, wherein the bolt is a step bolt, and the flat washer is made of rubber. With the adoption of a fixing structure in which the bolt and the flat washer are superimposed, vibration and working noises can be reduced during operation of the lead screw motor.

In a preferred embodiment of the present invention, the transmission racks are disposed on a transmission part, the transmission part is further provided with a nut mechanism accommodating cavity in which the nut mechanism is slidably arranged, and a moving trajectory of the nut mechanism is limited by the nut mechanism accommodating cavity.

In a preferred embodiment of the present invention, the headrest rear cover plate is provided with at least one rear cover rib, and the transmission part is provided with at least one transmission part groove; the rear cover rib and the transmission part groove cooperate with each other to form a sliding groove structure, and when the lead screw motor drives the headrest rear cover plate to move via the gear mechanism, the sliding groove structure provides guidance for movements of the headrest part.

In a preferred embodiment of the present invention, the headrest structure further comprises a receiving groove provided at a lateral portion of the rear cover rib, and an ambient light is embedded in the receiving groove.

In a preferred embodiment of the present invention, nut lugs are provided at lateral portions of the nut mechanism, nut grooves are provided in the nut mechanism accommodating cavity, and the nut lugs are placed in the nut grooves, so that the nut mechanism can only move vertically without rotating around a vertical direction when being driven by the lead screw motor.

In a preferred embodiment of the present invention, the gear shaft is further provided with stop rings for limiting mounting positions of the gears and the gear shaft to thereby prevent the gears, the gear shaft and the shaft sleeve from failing due to assembly dislocation.

In a preferred embodiment of the present invention, the headrest part is provided with a headrest comfort layer on a front side thereof, and the headrest comfort layer is fixed to the headrest rear cover plate via fasteners.

In a preferred embodiment of the present invention, the headrest driving seat is provided with an encapsulating shell externally.

The present invention is beneficial in that: in the headrest structure according to the present invention, the transmission part provided with the transmission racks is rigidly connected and fixed to the headrest driving seat provided with the lead screw motor, and the rear cover racks are disposed on the rear surface of the headrest rear cover plate, so that the overall structural strength of the headrest is enhanced and more room is provided for the comfort layer, and meanwhile the external arrangement of the rear cover racks and the rear cover ribs gives consumers a new and light-weight sensory experience.

BRIEF DESCRIPTION OF THE DRAWINGS

In order to explain the technical solution in the embodiments of the present invention or that in the prior art more clearly, drawings required for describing the embodiments or the prior art will be briefly introduced below.

DETAILED EMBODIMENTS

Figure 1:
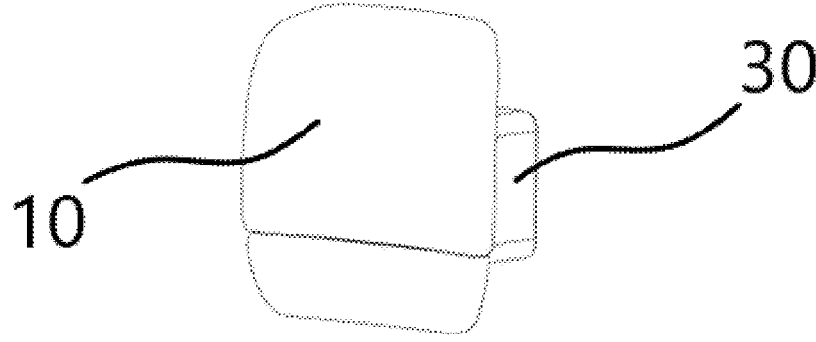
FIG. 1 is a front side view of a product in the present invention.
Figure 2:
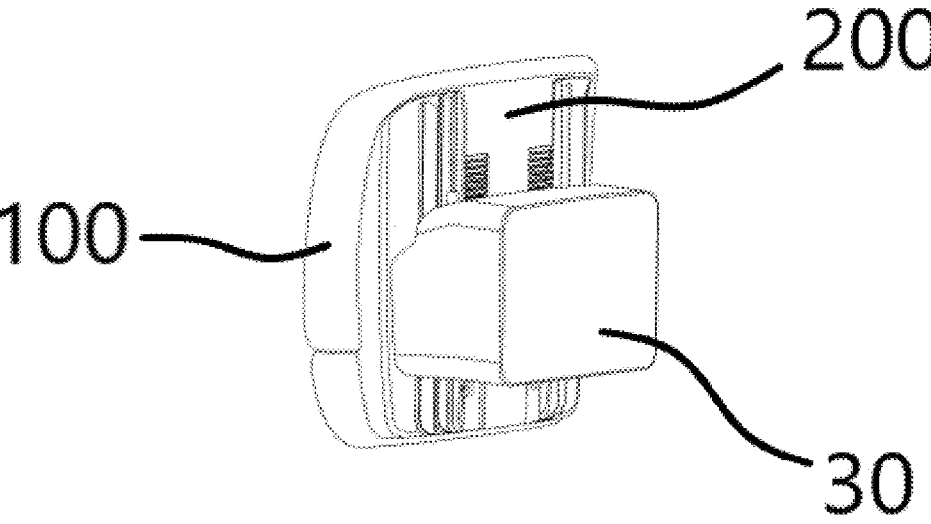
FIG. 2 is a rear side view of the product in the present invention.
Figure 3:
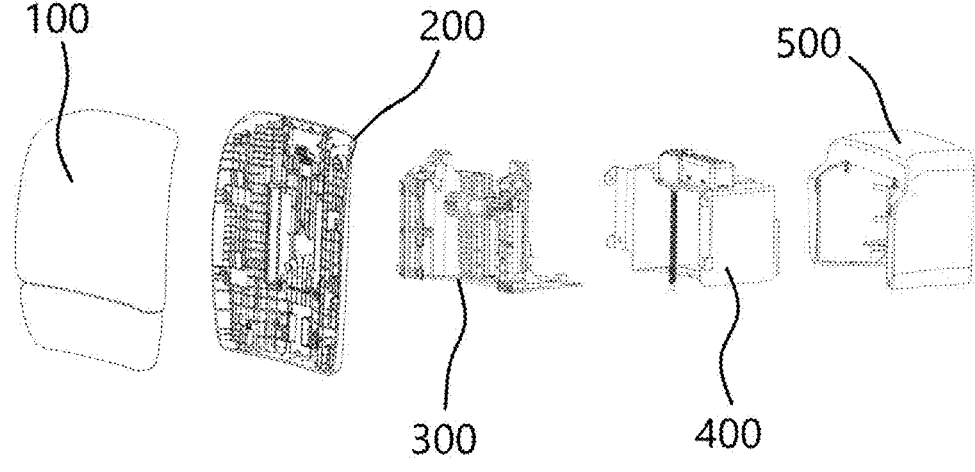
FIG. 3 is a first exploded view of the product in the present invention.
Figure 4:
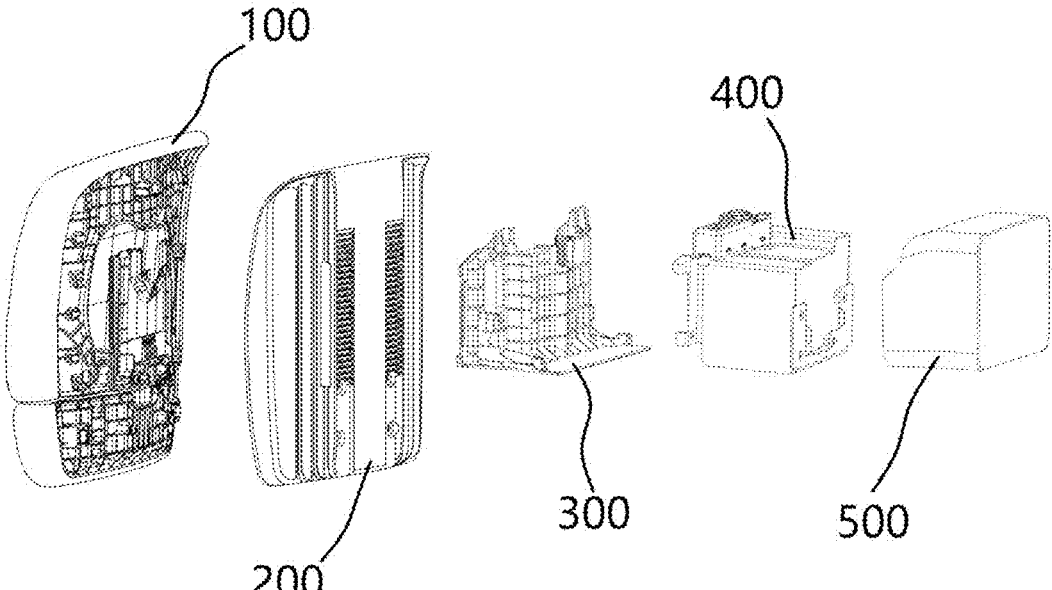
FIG. 4 is a second exploded view of the product in the present invention.

In the description of the present invention, it should be noted that the azimuth or positional relationship indicated by the terms "up", "down", "left", "right", "inside", "outside" or the like are based on the azimuth or positional relationship shown in the attached drawings, and "longitudinal (X direction)", "lateral (Y direction)" and "vertical (Z direction)" are terms for the space coordinate system in the automotive field, which are professional terms well known to those skilled in the art. The above terms are for the convenience of describing the present invention and do not indicate or imply that the indicated devices or elements must have a specific orientation or be constructed and operated in a specific orientation, so they shall not be construed as restricting the present invention.

The detailed structure of the present invention will be further described with reference to the attached drawings and specific embodiments.

Referring to FIGS. 1 to 4, the integrated headrest structure of the present invention primarily includes a driving part 30 mounted on a seat backrest of an automobile, and a headrest part 10 mounted in front of the driving part 30. The driving part 30 may be divided into a transmission part 300, a headrest driving seat 400 and an encapsulating shell 500 from front to back along a longitudinal axis. The headrest part 10 is formed by assembling a headrest comfort layer 100 with a headrest rear cover plate 200.

Figure 5:
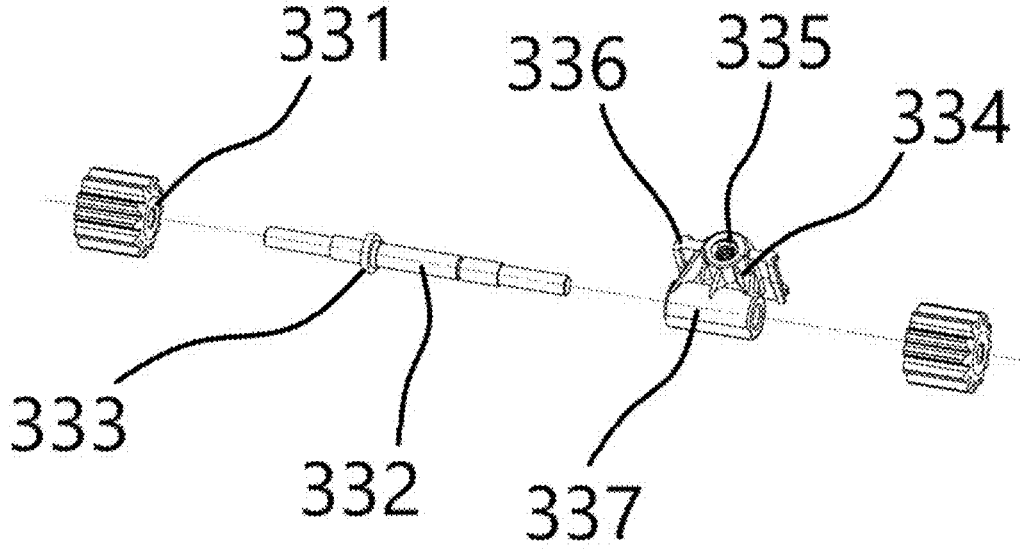
FIG. 5 is an exploded view of a gear mechanism in the present invention.
Figure 6:
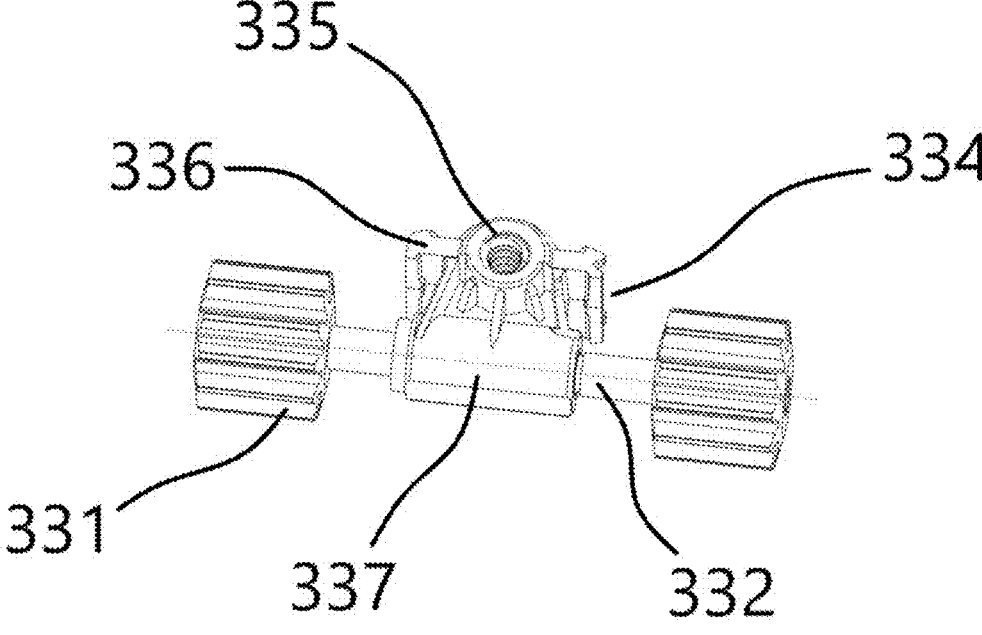
FIG. 6 is an overall structural view of the gear mechanism in the present invention.

Referring to FIGS. 5 and 6, the transmission part 300 is provided therein with a gear mechanism 330, which consists of a nut, a nut mechanism 334, a shaft sleeve 337, a gear shaft 332 and a pair of gears 331. At the central position of the nut mechanism 334 is provided a nut hole 335 in a Z-direction, a pair of nut lugs 336 protruding outwards are disposed at lateral positions of the nut mechanism 334 in a Y-direction respectively, and the shaft sleeve 337 is disposed on a front side of the nut mechanism 334 in an X-direction. The gear shaft 332 extends through the shaft sleeve 337 from one side, and two ends of the gear shaft 332 are each provided with one gear 331. The gear shaft 332 is further provided with a stop ring 333 for limiting position of the gear shaft 332 relative to the shaft sleeve 337 and preventing the gear shaft 332 from deviating from the designated position relative to the shaft sleeve 337 during assembly. The two ends of the gear shaft 332 are further provided with another pair of stop rings for limiting the position of the pair of gears 331. These stop rings can limit the mounting positions of the gears and the gear shaft to prevent the gears, the gear shaft and the shaft sleeve from failing due to assembly dislocation.

Figure 7:
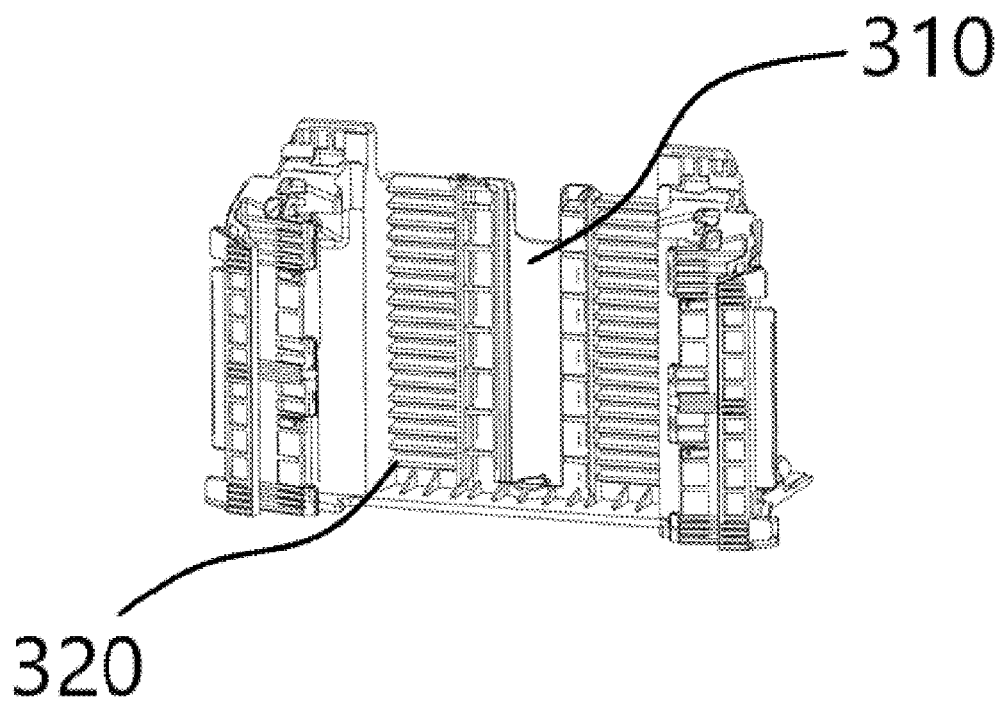
FIG. 7 is a structural view of a transmission part in the present invention.
Figure 8:
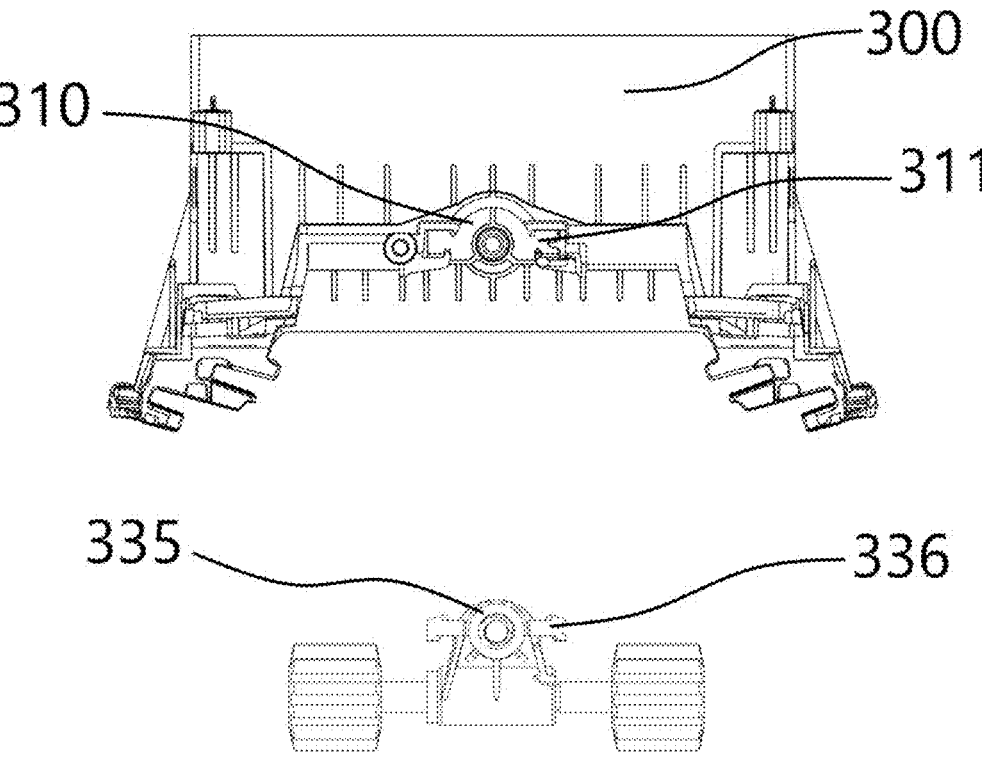
FIG. 8 is a top view of the transmission part in the present invention.

Referring to FIGS. 7 and 8, at the central position of the transmission part 300 is provided a nut mechanism accommodating cavity 310 along the Z-axis direction. At the lateral positions of the nut mechanism accommodating cavity 310 are further provided with a pair of nut grooves 311 respectively, wherein the nut mechanism accommodating cavity 310 and the nut grooves 311 are laterally distributed along the Y-axis direction. The spatial configurations of the nut mechanism accommodating cavity 310 and the nut grooves 311 are similar to those of the nut hole 335 and the nut lugs 336, so that the nut mechanism 334 can move vertically downward into the nut mechanism accommodating cavity 310 from above and move within the nut mechanism accommodating cavity 310, wherein said nut mechanism 334 can only move in the Z direction due to the limitation of the above-mentioned structures. A pair of transmission racks 320 are provided on the transmission part 300. The transmission racks 320 are disposed on the left and right sides of the nut mechanism accommodating cavity 310 respectively.

Figures 9, 10:
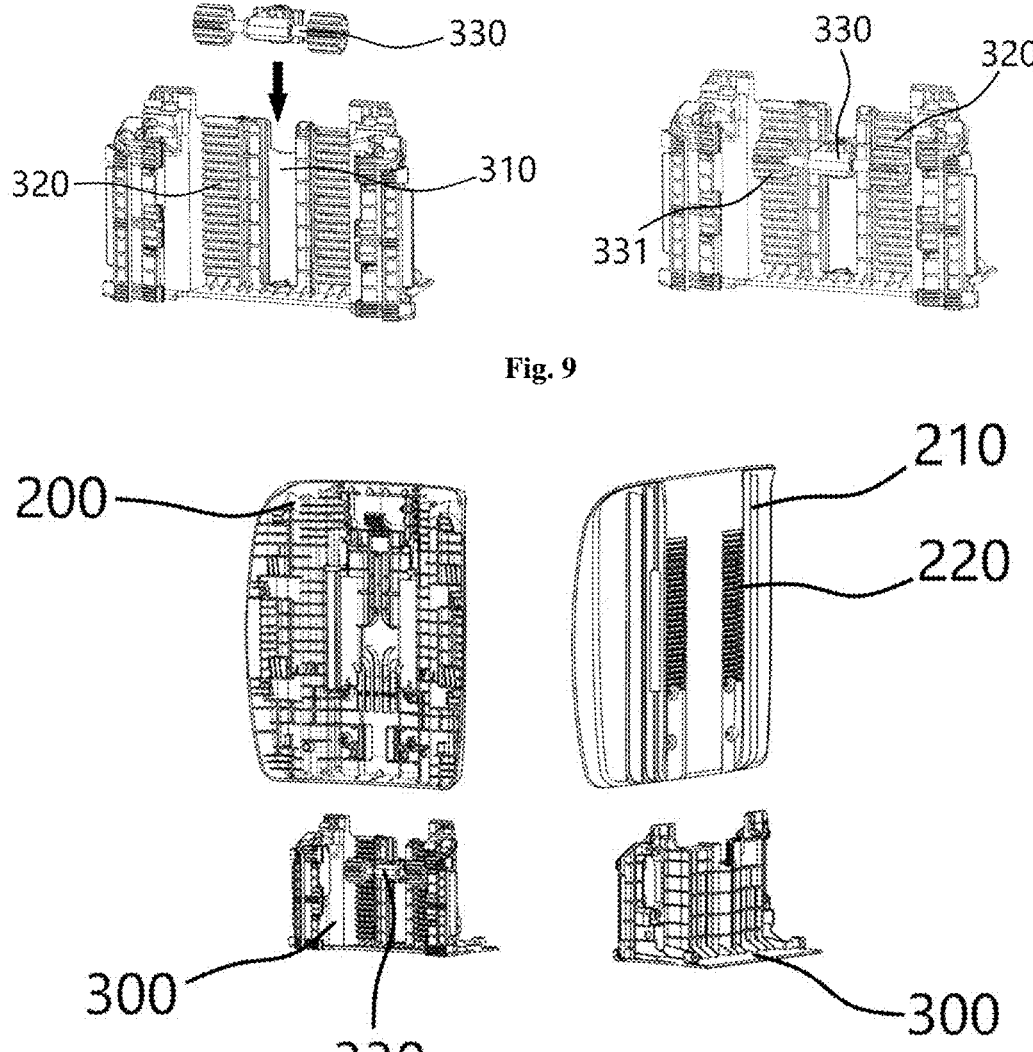
FIG. 9 is a schematic assembly view of the gear mechanism and the transmission part in the present invention.
FIG. 10 is a schematic structural view of a headrest rear cover plate and the transmission part in the present invention.

Referring to FIG. 9, when the nut mechanism 330 is mounted downward into the nut mechanism accommodating cavity 310 along the arrow direction, the pair of gears 331 are engaged with the corresponding transmission racks 320 respectively. When the nut mechanism 330 moves within the nut mechanism accommodating cavity 310 in the Z direction, the gears 331 move on the transmission racks 320, and during movement the gears 331 on both sides are coaxial in the Y direction and the positions of the gears in the Z-direction are same.

Figures 11, 12:
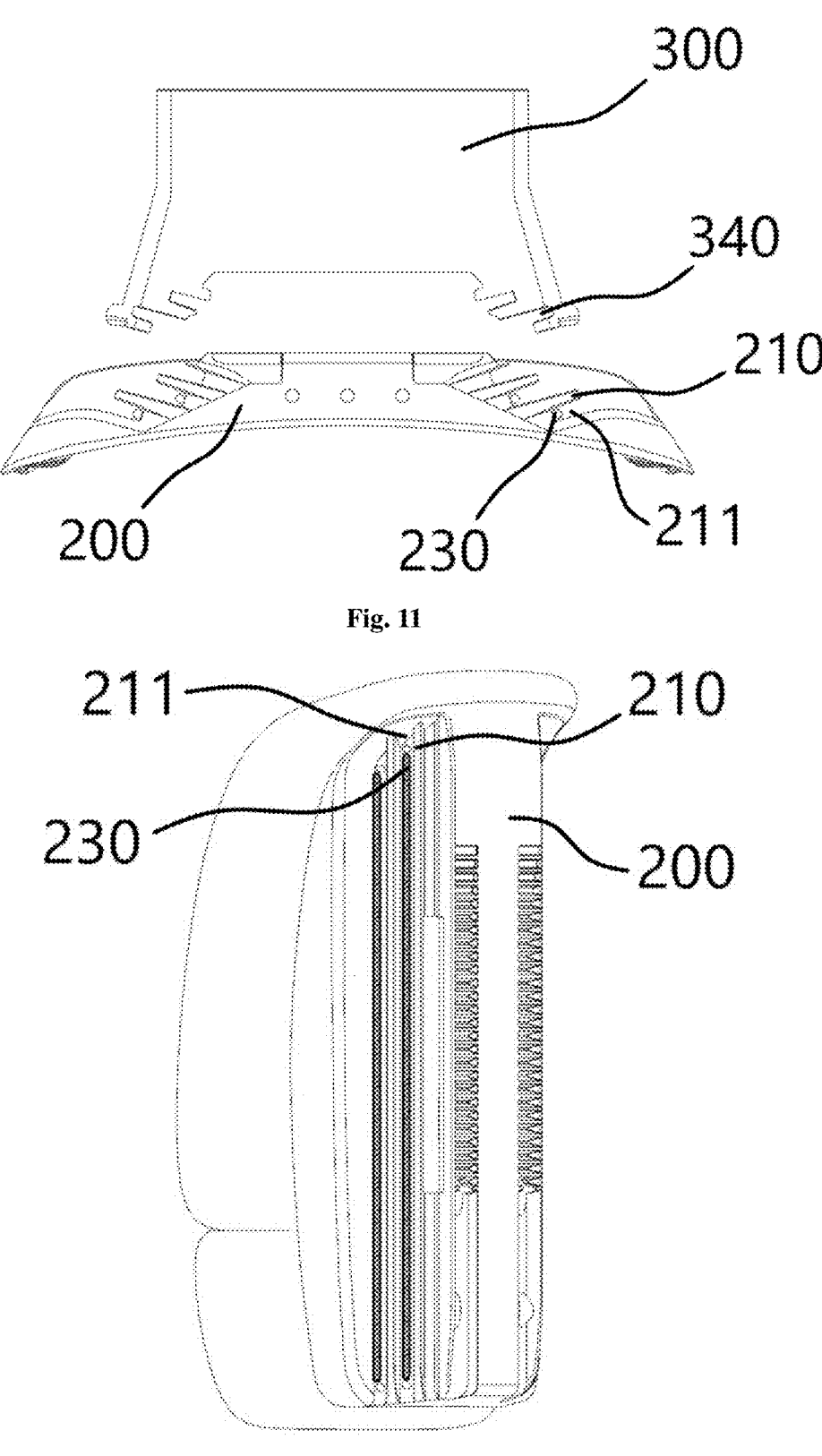
FIG. 11 is a schematic matching view of the headrest rear cover plate with the transmission part in the present invention.
FIG. 12 is a schematic structural view of a receiving groove and an ambient light on the headrest rear cover plate in the present invention.

Referring to FIGS. 10 to 12, a pair of rear cover racks 220 are provided on the rear surface of the headrest rear cover plate 200. A total number of four rear cover ribs 210 distributed along the Z direction are provided at both sides of the rear surface of the headrest rear cover plate 200, with two rear cover ribs 210 being provided on each side. Likewise, transmission part grooves 340 distributed along the Z-direction are further provided at both sides of the front end of the transmission part 300. The profile of the transmission part grooves 340 matches the profile of the rear cover ribs 210, so the transmission part grooves and the rear cover ribs cooperate with each other to form a sliding groove structure. After the rear cover ribs 210 and the transmission part grooves 340 are in sliding fit with each other, a receiving groove 211 located at the lateral portion of the rear cover rib 210 is formed. An ambient light strip 230 is arranged in the receiving groove 211.

Figure 13:
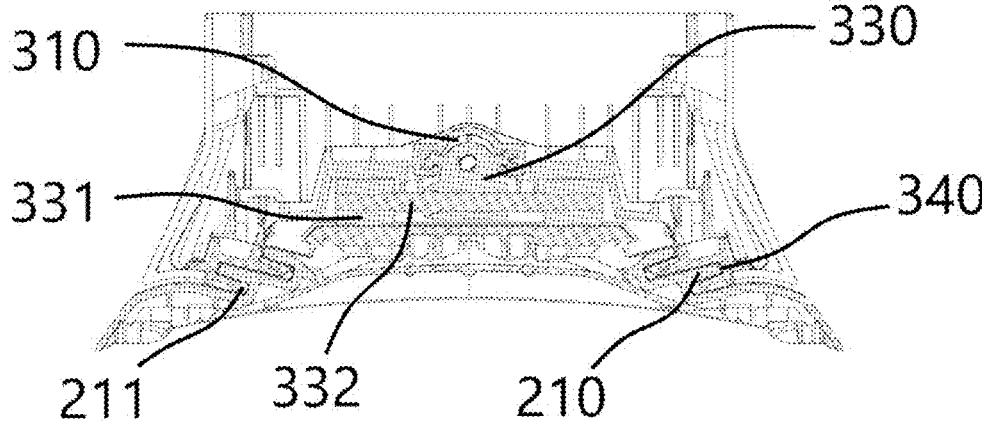
FIG. 13 is a first schematic assembly view of the headrest rear cover plate and the transmission part in the present invention.
Figure 14:
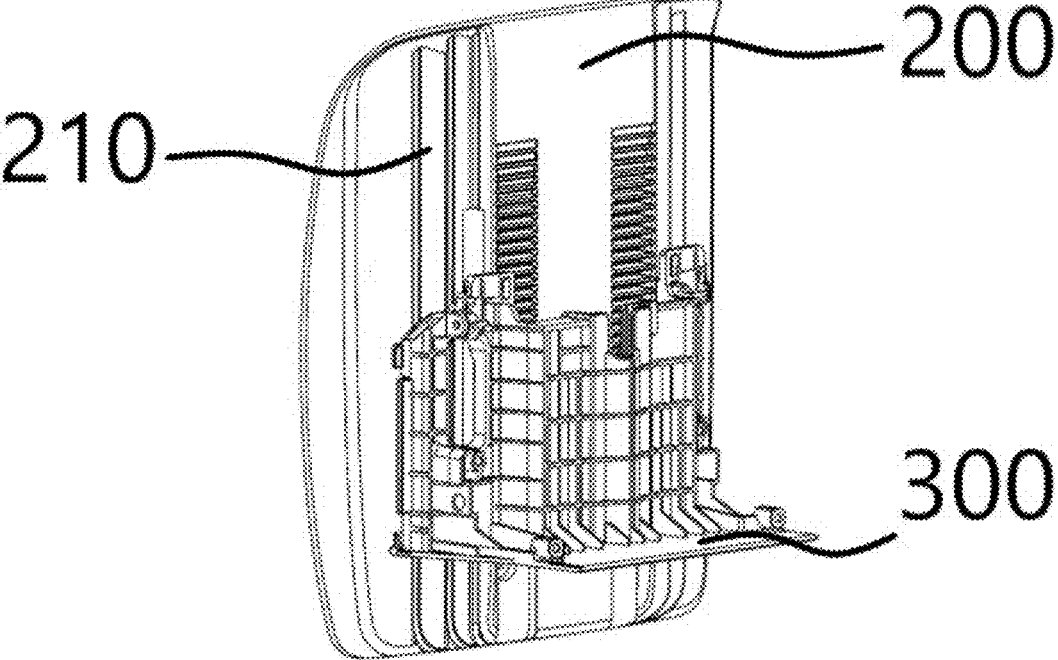
FIG. 14 is a second schematic assembly view of the headrest rear cover plate and the transmission part in the present invention.

Referring to FIGS. 13 and 14, during assembling the transmission part 300 with the headrest rear cover plate 200, the headrest rear cover plate 200 is inserted downward into the transmission part 300 from above, wherein the rear cover ribs 210 on the headrest rear cover plate 200 are embedded into the transmission part grooves 340, such that the movement of the headrest rear cover plate 200 is limited after assembly and it can only move in the Z-direction relative to the transmission part 300 (due to limitation of the above sliding groove structure). After assembly of the transmission part 300 with the headrest rear cover plate 200, the gears 331 finish meshing with the rear cover racks 220 at the front side and the transmission racks 320 at the rear side.

Figures 15, 16:
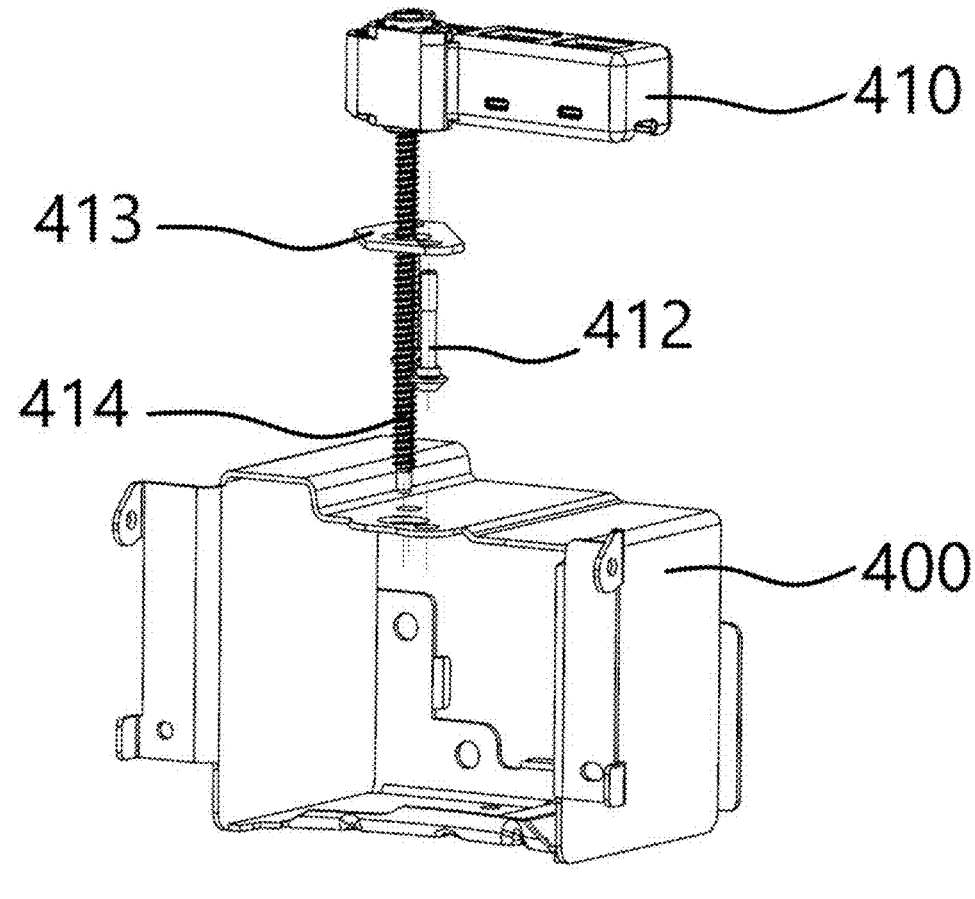
FIG. 15 is a first schematic assembly view of a lead screw motor and a headrest driving seat in the present invention.
FIG. 16 is a second schematic assembly view of the lead screw motor and the headrest driving seat in the present invention.

Referring to FIGS. 15 and 16, an output end of a lead screw motor 410 is provided with a lead screw 414 extending outward. The lead screw motor 410 is fixed above the driving seat 400 by a bolt 412 extending through the driving seat 400 and a flat washer 413 from below. The lead screw 414 extends from top to bottom in the Z-direction. The bolt 412 is a step bolt, and the flat washer 413 is made of rubber. With the adoption of a fixing structure in which the bolt 412 and the flat washer 413 are superimposed, vibration and working noises can be reduced during operation of the lead screw motor 410.

Figures 17, 18:
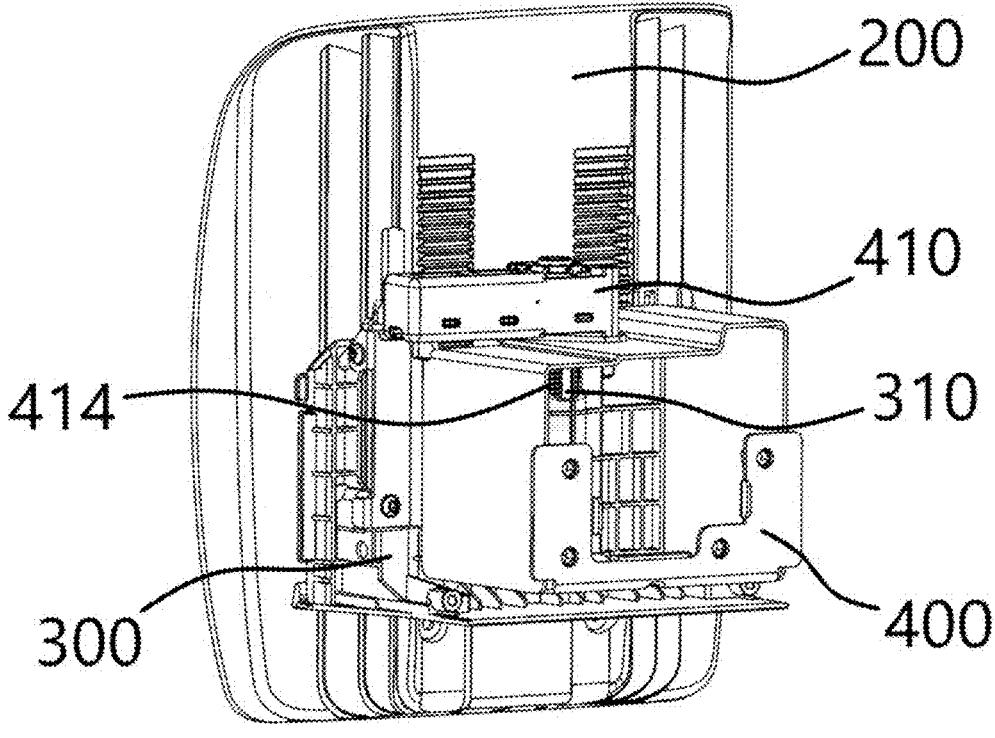
FIG. 17 is a schematic assembly view of the transmission part and the headrest driving seat in the present invention.
FIG. 18 is an assembly view of the transmission part, the headrest driving seat and an encapsulating shell in the present invention.

Referring to FIGS. 17 and 18, the headrest driving seat 400 is mounted at the rear side of the transmission part 300, and the lead screw 414 extends through the nut hole 335 from above so that the lead screw motor 410 engages with the nut mechanism 334, thereby driving the nut mechanism 334 to move inside the nut mechanism accommodating cavity 310 in the Z-direction. Finally, the encapsulating shell 500 is assembled on the outermost layer of the headrest driving seat 400 and the transmission part 300 to embody the A-surface modeling design of the driving part 30.

Figures 19, 20:
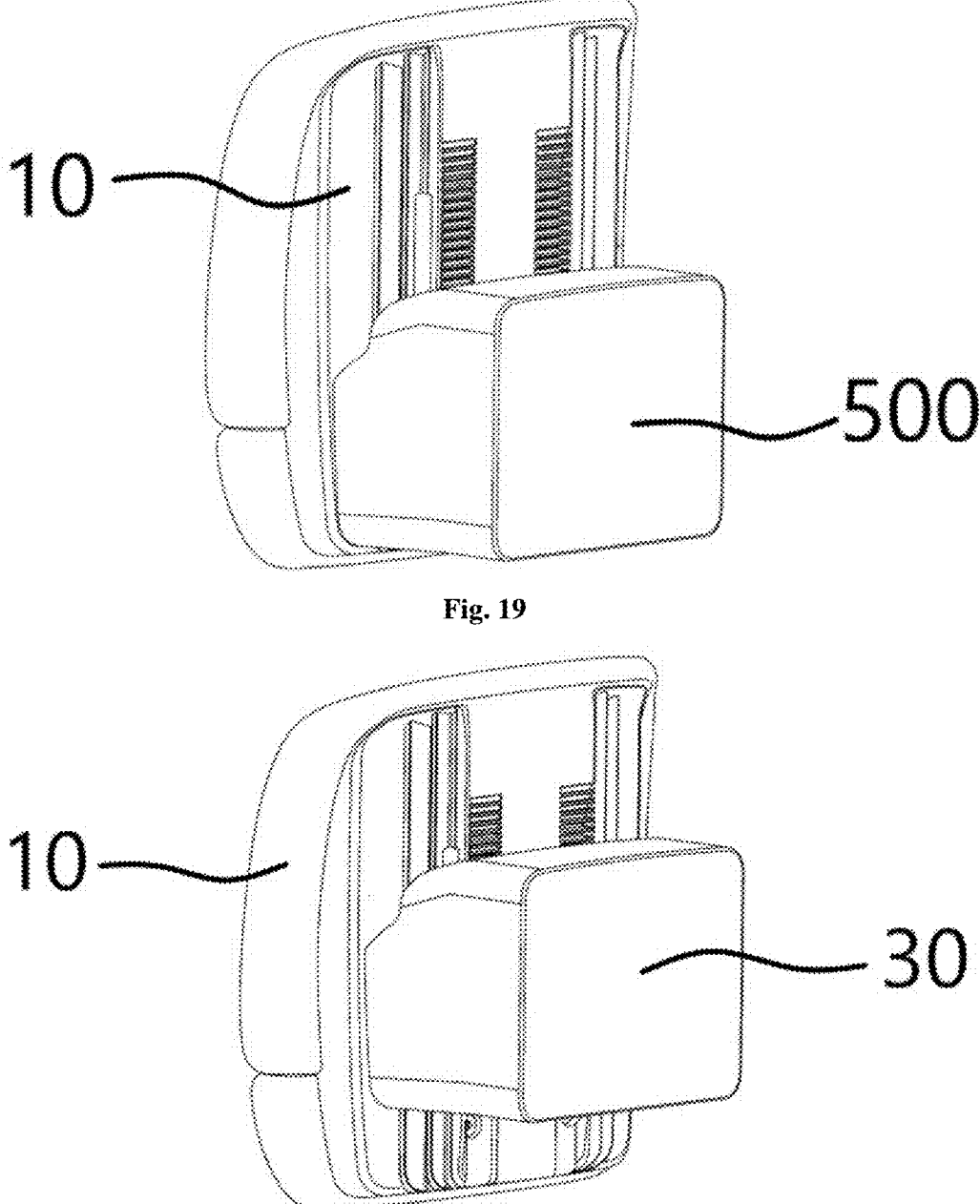
FIG. 19 is a schematic view in which a headrest part of the present invention is located at the highest point of a headrest driving part.
FIG. 20 is a schematic view in which the headrest part of the present invention is located at the midpoint of the headrest driving part.
Figure 21:
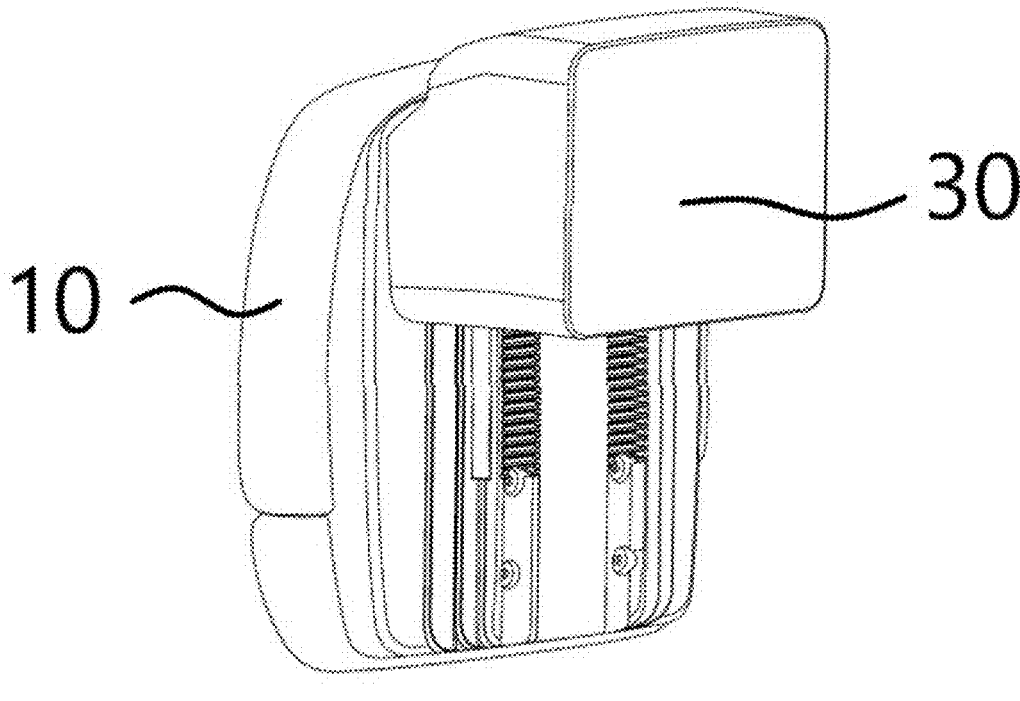
FIG. 21 is a schematic view in which the headrest part of the present invention is located at the lowest point of the headrest driving part.

Referring to FIGS. 19-21, when the headrest works, the lead screw motor 410 in the driving part 30 drives the gear mechanism 330 to move in the Z-direction with reference to the transmission racks 320 in the driving part based on the principle of a lead screw transmission mechanism. When the gear mechanism 330 is moved upwards, the rear cover racks 220 are driven by the gears 331 to synchronously move the headrest part 10 upwardly; and when the gear mechanism 330 is moved downward, the rear cover racks 220 are driven to move downward synchronously.

Figure 22:
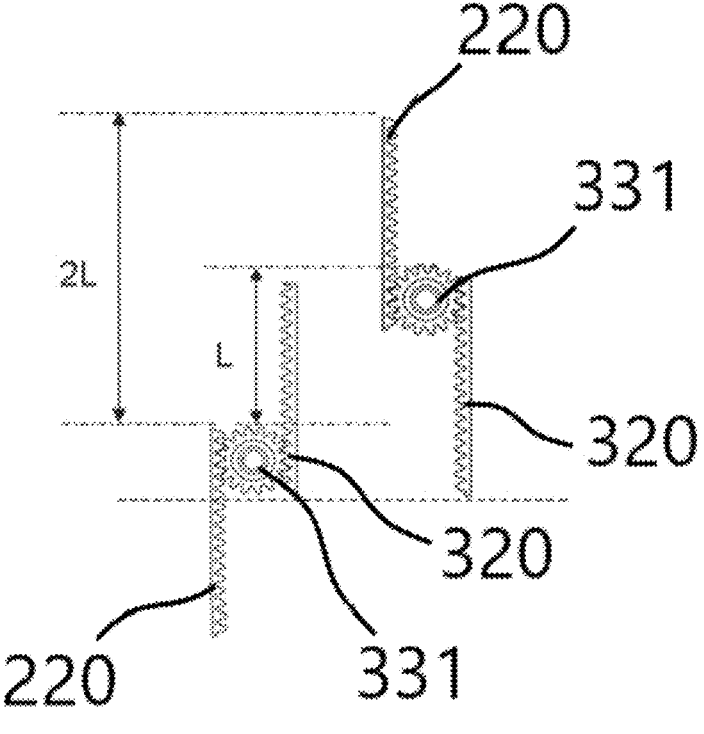
FIG. 22 is a schematic view showing the relationship among gears, transmission racks and rear cover racks when the headrest part of the present invention moves relative to the headrest driving part.

Referring to FIG. 22, the stroke of the headrest part 10 is 2L, and the length of the transmission rack 320, equal to the length of the rear cover rack 220, is the sum of L and the diameter of the gear 331. The adjustment stroke of the headrest part 10 is enlarged by the composite structure of the gear 331, the transmission rack 320 and the rear cover rack 220.

Figure 23:
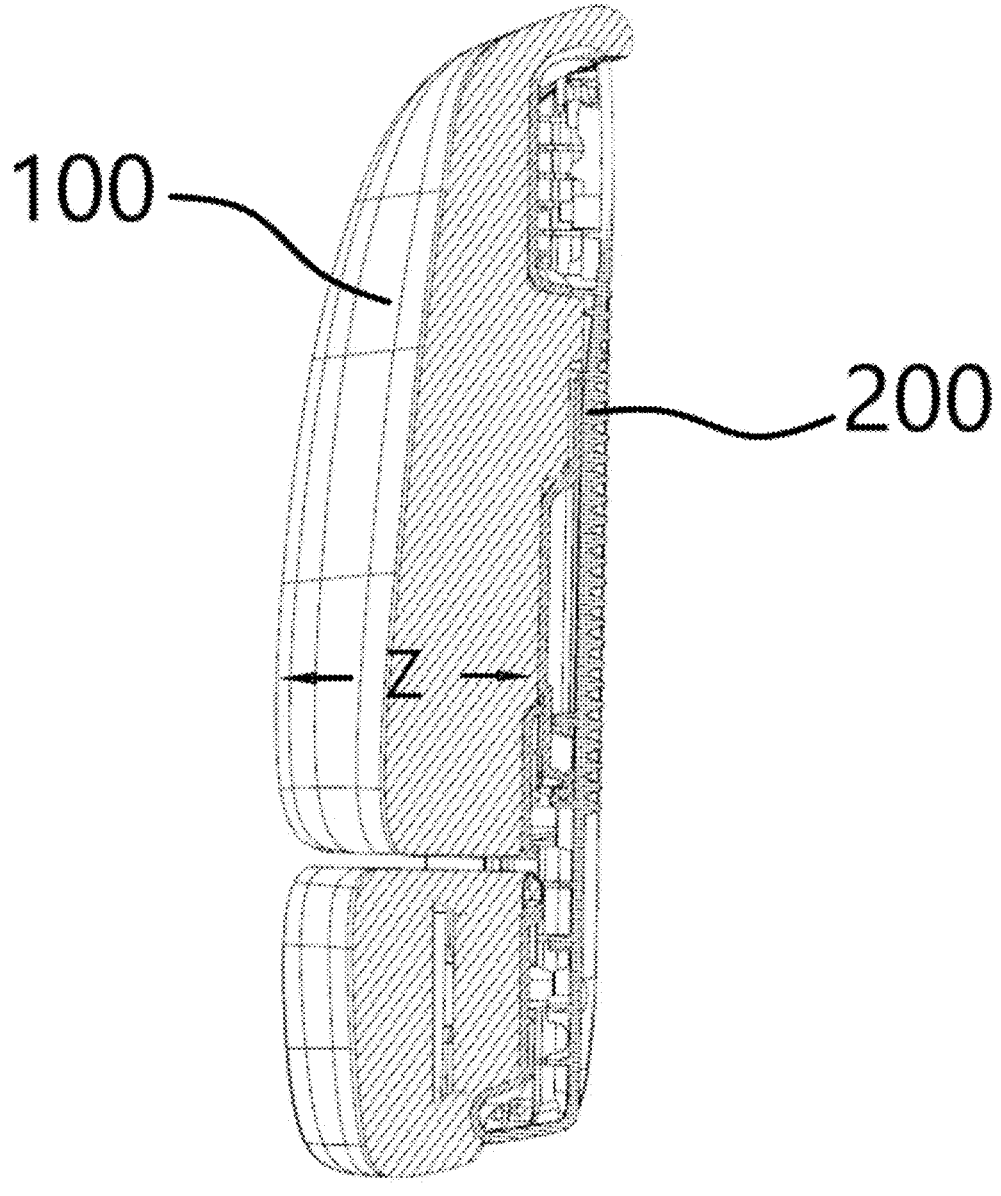
FIG. 23 is a schematic view showing the thickness of the foam in the comfort layer of the present invention.

Referring to FIG. 23, the technical effects achieved by the present invention mainly lie in that: the transmission part 300 provided with the transmission racks 320 is rigidly connected with the headrest driving seat 400 provided with the lead screw motor 410, thus changing the conventional transitional connection structure in the form of a slider, and improving the connection strength between respective parts, which can reduce the failure probability of the headrest structure when the automobile is impacted. At the same time, arrangement of the rear cover racks 220 on the A-surface (i.e., the rear surface) of the headrest rear cover plate 200 enables the movement mechanisms such as the driving part 30 not to occupy the internal space of the headrest part 10, thereby providing more room for the headrest comfort layer 100 to increase the thickness Z of the foam in the headrest, and accordingly improving the comfortability of the headrest. Meanwhile, the exposed structure of the rear cover ribs 210 and the rear cover racks 220 also gives passengers a new, light-weight and unique experience.

The invention claimed is:

1. A headrest structure comprising a driving part mounted on a seat backrest of an automobile and a headrest part mounted in front of the driving part, characterized in that, the driving part comprises a transmission part, a headrest driving seat and an encapsulating shell, wherein the transmission part is provided therein with a gear mechanism and the transmission part is provided thereon with transmission racks along a vertical direction, wherein the headrest driving seat is fixed to the seat backrest, and wherein the transmission part is rigidly connected with the headrest driving seat, the headrest part comprises a headrest rear cover plate, and a rear surface of the headrest rear cover plate is provided thereon with rear cover racks along the vertical direction;

the gear mechanism is engaged between the rear cover racks and the transmission racks;

wherein the headrest structure further comprises a lead screw motor which drives the gear mechanism to move along the vertical direction according to a principle of a lead screw transmission mechanism, thereby driving the headrest part to move relative to the headrest driving seat, the gear mechanism including a nut mechanism, a shaft sleeve, a gear shaft and a pair of gears, the gear shaft extending through the shaft sleeve, and the pair of gears being provided at two ends of the gear shaft respectively and engaged between the rear cover racks and the transmission racks, the lead screw motor being fixed to the headrest driving seat, and the lead screw motor driving the gear mechanism to move via the nut mechanism during operation, thereby enabling the pair of gears engaged between the rear cover racks and the transmission racks to rotate to drive the headrest rear cover plate to move.

2. The headrest structure according to claim 1, characterized in that the lead screw motor is fixed above the headrest driving seat by a bolt extending through the headrest driving seat and a flat washer from below, wherein the bolt is a step bolt, and the flat washer is made of rubber.

3. The headrest structure according to claim 1 characterized in that the transmission part is further provided with a nut mechanism accommodating cavity in which the nut mechanism is slidably arranged, and a moving trajectory of the nut mechanism is limited by the nut mechanism accommodating cavity.

4. The headrest structure according to claim 3, characterized in that the headrest rear cover plate is further provided with at least one rear cover rib, and the transmission part is provided with at least one transmission part groove, the rear cover rib and the transmission part groove cooperate with each other to form a sliding groove structure, and when the lead screw motor drives the headrest rear cover plate to move via the gear mechanism, the sliding groove structure provides guidance for movements of the headrest part.

5. The headrest structure according to claim 4, characterized in that the headrest structure further comprises a receiving groove provided at a lateral portion of the rear cover rib, and an ambient light is embedded in the receiving groove.

6. The headrest structure according to claim 3, characterized in that nut lugs are provided at lateral portions of the nut mechanism, nut grooves are provided in the nut mechanism accommodating cavity, and the nut lugs are provided in the nut grooves, so that the nut mechanism can only move vertically without rotating around the vertical direction when being driven by the lead screw motor.

7. The headrest structure according to claim 1, characterized in that the gear shaft is further provided with stop rings for limiting mounting positions of the pair of gears and the gear shaft to thereby prevent the pair of gears, the gear shaft and the shaft sleeve from failing due to assembly dislocation.

8. The headrest structure according to claim 1, characterized in that the headrest part is provided with a headrest comfort layer on a front side thereof, and the headrest comfort layer is fixed to the headrest rear cover plate via fasteners.

9. The headrest structure according to claim 8, characterized in that the encapsulating shell is provided externally on the headrest driving seat.

\* \* \* \* \*